United States Patent [19]

Struthers

[11] Patent Number: 4,503,132
[45] Date of Patent: Mar. 5, 1985

[54] FUEL CELL ELECTRODE

[76] Inventor: Ralph C. Struthers, 39503 Calle El Fuente, Saugus, Calif. 91350

[21] Appl. No.: 473,036

[22] Filed: Mar. 7, 1983

[51] Int. Cl.³ ............................................ H01M 4/06
[52] U.S. Cl. ...................................... 429/40; 429/27
[58] Field of Search ................................. 429/40–45, 429/27–29

[56] References Cited

U.S. PATENT DOCUMENTS

| | | | |
|---|---|---|---|
| 3,484,298 | 12/1969 | Nichols | 429/40 |
| 3,748,179 | 7/1973 | Bushnell | 429/40 X |
| 3,871,922 | 3/1975 | Böhm | 429/40 |
| 3,977,901 | 8/1976 | Buzzelli | 429/40 |
| 4,352,864 | 10/1982 | Struthers | 429/40 |

Primary Examiner—Charles F. LeFevour
Attorney, Agent, or Firm—Georges A. Maxwell

[57] ABSTRACT

A flat, laminated fuel cell gas electrode arranged between and separating gas and liquid mediums in a fuel cell. The electrode includes a flat, perforated sheet metal support and electric conductor part with a rear surface disposed toward the gas medium, a flat, hydrophobic gas permeable membrane with a rear surface in contact with a front surface of said part, a flat liquid and gas permeable metallic current collector with a rear surface spaced from a front surface of said membrane and with a front surface disposed toward the liquid medium, a catalytic barrier structure of bonded together particulate catalytic material and metal conductor filaments by and in electric conducting contact with the collector and having a rear surface in contact with the front surface of the membrane and a plurality of spaced apart electric conducting fasteners engaged with and between said part and collector securing the parts of the electrode in assembled relationship and electrically connecting the current collector with said part.

16 Claims, 10 Drawing Figures

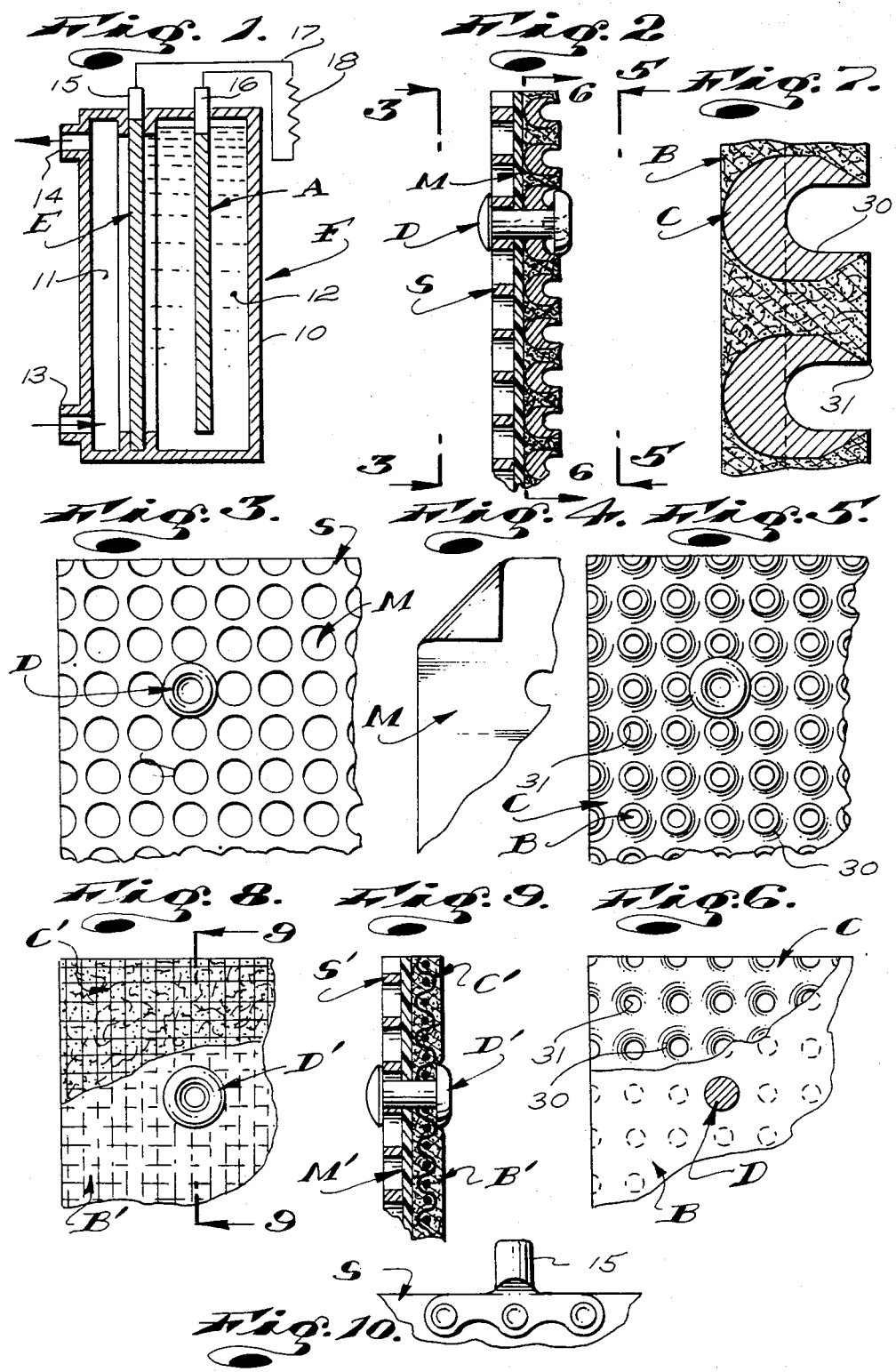

FUEL CELL ELECTRODE

This invention has to do with fuel cells and is particularly concerned with an improved fuel cell gas electrode.

BACKGROUND OF THE INVENTION

In the art of fuel cells, there is that class of fuel cell wherein fuel cell reaction is supported (in part) by a gas, such as the oxygen in air. Such fuel cells typically include metal fuel anode electrodes immersed in electrolytes and flat or partition-like cathode electrodes which include catalytic interface structures of highly active catalytic material with great surface area in contact with the electrolyte and with the gas. While fuel cells of the character referred to above might be theoretically operable and efficient, the establishing of such cells which are effective, dependable and practical has been thwarted by the failure of the prior art to provide gas electrodes which are structurally stable or sound and which are both electrically and chemically effective and efficient.

The effectiveness and efficiency of gas electrodes for fuel cells are primarily dependent upon the provision and use of catalytic barrier structures which are highly active. The activity of such structures is greatly dependent upon the number of active sites and the cumulative surface area presented thereby. Accordingly, such barrier structures are, as a general rule, made up of volumes of finely divided particulate materials such as activated charcoal, which have many active sites and present large surface areas. Since it is necessary that the active sites and/or surfaces of such materials be exposed to and contact the fuel cell electrolytes to effectively support fuel cell reaction, the catalytic barrier structures established thereof must be quite porous and capable of being freely wetted by the electrolytes and permeated by the gases. Accordingly, the active particulate materials making up such catalytic barrier structures cannot be contained and sealed within matrixes of bonding materials or agents, but rather, must be held together and contained by appropriate mechanical means and/or by the use of as little binding material as is possible.

As a result of the foregoing, catalytic barrier structures for gas electrodes for fuel cells are characteristically, if not necessarily, structurally weak and frangible or friable structures which are highly subject to structural failure in the environments in which such electrode structures are used.

In addition to the above, the materials suitable for establishing the catalytic barrier structures for fuel cell gas electrodes and/or the resulting barrier structures are, for the most part, rather poor electric conductors. As a result of the foregoing, such gas electrode structures require and include current collector means to collect current throughout the surface areas of the barrier structures and to conduct that current away for suitable use and to maintain sufficient fuel cell operation.

To the above end, fuel cell gas electrodes provided by the prior art characteristically include woven metal fabric current collectors embodied within the catalytic barrier structures. Such current collectors, in addition to collecting and conducting current away, as required, serve as reinforcing and supporting means for the barrier structures. Though provision and use of such current collector means helps to stabilize the catalytic barrier structures, they are insufficient to establish structurally sound and stable structures suitable for dependable and practical use. Further, while current collectors of metal fabric screen and equivalent metal structures efficiently collect current throughout their related catalytic barrier structures, they have considerable internal resistance and are generally such that they fail to effectively and efficiently conduct the collected current away in an effective manner. Accordingly, they are not very effective and notably limit fuel cell efficiency.

Finally, in fuel cells gas electrodes provided by the prior art, the gas sides or surfaces of the catalytic barrier structures are commonly covered and supported by sheet-like membranes of hydrophobic or water-repellant gas permeable material which establish gas and electrolyte interfaces at the gas sides of the catalytic barrier structures, stop the flow of electrolyte from the catalytic barrier structures, at the gas surfaces thereof, and lend added structural support to said catalytic barrier structures. The sheet materials used to establish such membranes are generally quite thin and fragile and add little overall structural stability to their related catalytic barrier structures. The tendency for such sheet materials to separate or delaminate from their related catalytic barrier structures and to thereby prevent the assembled membranes and barrier structures from operating effectively is so great that the necessary inclusion and use thereof impedes and makes difficult the establishment of structurally sound and practical electrode structures.

OBJECTS AND FEATURES OF MY INVENTION

It is an object of my invention to provide a novel structurally sound and stable, chemically and electrically effective and efficient fuel cell gas electrode.

An object and feature of my invention is to provide a novel fuel cell gas electrode which, in addition to including a catalytic barrier structure in combination with a current collector means and a hydrophobic membrane, includes a strong, rigid, metal support and conductor part related to the exposed surface or gas side of the membrane and mechanically and electrically connected with the current collector means at or within the catalytic barrier structure at spaced points throughout the effective surface area of the electrode whereby the catalytic barrier structure, current collector means and membrane are well and stably supported and maintained in predetermined working relationship with each other and current collected by the current collector throughout different areas of the electrode is effectively and efficiently conducted away from the current collector by the support and conductor part for use, thereby avoiding the effects of internal resistance in the barrier structure and the current collector means and which would otherwise materially adversely affect the efficiency of the electrode structure.

It is another object and feature of my invention to provide an improved gas electrode of the general character referred to above wherein the catalytic barrier structure is a frangible, flat sheet or plate-like mass of particulate material, the current collector means is a sheet-like part of electric conducting metal in supporting contact with and substantially coextensive with the catalytic barrier structure; said support and conductor part is a rigid and structurally sound part of electric conducting metal, spaced from the current collector and securely mechanically and electrically fastened thereto by a plurality of spaced apart conductor fastener means.

It is an object and feature of my invention to provide an improved gas electrode of the general character referred to above wherein the support and conductor part is established of high open area perforated sheet metal which is a good conductor of electricity and which is of sufficient gauge to present adequate effective cross-sectional area to conduct current conducted to it from the current collector to a single terminal point thereon without appreciable electrical internal resistance and is sufficiently stable and strong to securely support and impart great stability to the whole of the electrode structure.

A further object and feature of my invention is to provide an improved gas electrode of the character referred to wherein the catalytic barrier structure is composed of highly active particulate material which is a relatively poor conductor of electricity and a barrier structure which includes a multiplicity of randomly disposed interengaged binding and conductor filaments of a malleable metal having a high index of electric conductivity disposed within and throughout the particulate material and contacting the current collector to bind together and lend support to the particulate material and to enhance the electric conductivity of said barrier structure.

Yet another object and feature of my invention is to provide an improved gas electrode of the general character referred to wherein the current collector is a thin sheet metal part with a front surface disposed towards the electrolyte in a related cell, a back surface disposed towards the membrane of the electrode and formed with a multiplicity of adjacent hollow forwardly projecting conical protruberances with truncated open front ends; the protruberances are filled by and the back surface of the collector is covered with the catalytic barrier structure whereby the barrier structure is substantially enclosed and held captive in and between said collector and membrane of the electrode structure. The open area of the collector defined by the open ends of the protruberances is sufficient to allow flow and/or migration of adequate electrolyte into the barrier structure to assure effective and sufficient wetting thereof by the electrolyte to establish and maintain effective and efficient fuel cell operation.

It is an object and feature of my invention to provide a structure of the character referred to above wherein the current collector forms the front surface of the catalytic barrier structure with a multiplicity of forwardly projecting conical protruberances which materially increase the front surface area of the barrier structure and wherein the interface between said barrier structure and current collector cooperate to induce the migration and/or flow of electrolyte throughout the front surface of the barrier structure as a result of capillary attraction.

Finally, it is an object and feature of my invention to provide an improved and novel gas electrode structure of the general character referred to in the foregoing which is such that it lends itself to being established of many different materials whereby it can be made to most effectively and efficiently operate in environments which are either acid or alkaline and where it functions as either an anode electrode or a cathode electrode.

The foregoing and other objects and features of my invention will be apparent and will be fully understood from the following detailed description of typical preferred forms and applications of my invention, throughout which description reference is made to the accompanying drawings.

DESCRIPTION OF THE DRAWINGS

FIG. 1 is a diagrammatic sectional view of a gas/metal fuel cell with a gas electrode;

FIG. 2 is an enlarged cross-sectional view of a portion of the gas electrode structure that I provide;

FIG. 3 is a back view of my electrode structure taken substantially as indicated by line 3—3 on FIG. 2;

FIG. 4 is a view of a portion of the membrane;

FIG. 5 is a front view of the electrode taken substantially as indicated by line 5—5 on FIG. 2;

FIG. 6 is a view taken substantially as indicated by line 6—6 on FIG. 2;

FIG. 7 is an enlarged detailed sectional view of a portion of the structure shown in FIG. 2;

FIG. 8 is a view similar to FIG. 5 showing another embodiment of my invention;

FIG. 9 is a sectional view taken substantially as indicated by line 9—9 on FIG. 8; and FIG. 10 is a view showing a terminal related to the electrode.

DETAILED DESCRIPTION OF THE INVENTION

In FIG. 1 of the drawings, I have diagrammatically illustrated a gas/metal fuel cell F. The fuel cell F includes a case 10. The interior of the case is divided to define a gas chamber 11 and an electrolyte chamber 12 by a cathode gas electrode structure E. The electrolyte chamber 12 is filled with an electrolyte and an anode electrode A of a suitable metal fuel, such as aluminum, is immersed therein. The case 10 is provided with gas inlets and outlets 13 and 14 to conduct gas into and out of the chamber 11 and to effect scrubbing of the electrode E with the gas. If the gas employed is air (or oxygen in the air), the chamber 11 can be fully opened to atmosphere and the gas inlet and outlet fittings 13 and 14 and the wall of the case 10 with which those fittings are related, can be eliminated.

The electrode E dividing the case to define the chambers 10 and 11 is a flat plate-like structure with a front side disposed toward a chamber 12, a rear side disposed toward the chamber 11 and edge portions which are suitably mounted and sealed with related inside surfaces and/or walls of the case. For example, the case can have vertical side and horizontal bottom walls with channels formed therein to sealingly accommodate vertical side and horizontal bottom edges of the electrode and can have a top wall with a slot opening therein to accommodate and to enable engagement of the electrode into the case, substantially as indicated in FIG. 1 of the drawings.

The anode A is a flat plate-like part substantially equal in plan configuration with the effective surface area of the electrode E and is in spaced parallel relationship therewith.

The electrodes A and E are provided with suitable terminal posts 15 and 16 which project up through the top wall of the case 10 and which are connected with a suitable circuit 17. The circuit 17 can include a load 18 and is such that it provides for the flow of electrons from the anode electrode A to the cathode electrode E during fuel cell operation.

It is to be understood that the cell F illustrated and described above is intended to show one simple and basic form of fuel cell which my new gas electrode structure can be advantageously used in and is not intended to restrict or limit the use to which my new electrode can be put.

In FIGS. 2 through 7 of the drawings I have illustrated one preferred form of gas electrode E embodying my invention.

The electrode E is a thin, flat laminated assembly of elements and parts which, in practice, may be less than ¼" thick. For the purpose of this disclosure, the electrode E will be described as being disposed vertically and as having a back side or surface which opposes or is in contact with the gas in a related cell and as having a front side or surface which opposes and is in contact with the electrolyte in a related fuel cell. Further, for the purpose of this disclosure, the electrode can be viewed or considered to being rectangular in plan configuration and as having top bottom and side edges.

Referring to FIG. 2 of the drawings, I have shown the upper left-hand corner portion of the electrode structure E in section. Commencing at the left-hand side of FIG. 2, the electrode structure E includes a support and conductor part S, a membrane M, a catalytic barrier structure B and a current collector C. In addition to the above, the electrode structure E includes a plurality of spaced conductor fasteners D, one of which is shown in the drawings.

The support and conductor part S is a flat, perforated part established of a metal having a good or high index of electric conductivity. It is important to note that in practice, the part S is exposed to the gas of its related fuel cell and is therefore such that it is not subject to highly corrosive conditions. Accordingly, in most cases, the part S can be made of inexpensive metals such as aluminum or ferrous metals without fear of premature corrosive degradation thereof.

In practice, and in one satisfactory reduction to practice of my invention, the part S is established of 20 gauge perforated steel which is 63 percent open. According to the ideas of means of my invention, the percentage of open area of the part S should be maintained as high or as great as possible, without sacrificing or adversely affecting the structural integrity and/or strength of that part. In accordance with my findings, the open area of the part S should not be less than 50 percent and might be in excess of 75 percent, depending upon the metal of which the part is made.

In regard to the above, it is to be noted that the part S, in addition to affording structural support for the construction, serves as an electric conductor part and as such, its effective cross-section should be maintained as great as is possible. If the part S is made of copper, its percentage of open area can be increased and its effective cross-sectional area can be reduced, due to the better electric conductivity of copper.

It is my present understanding and belief that depending upon the metal of which the part S is established and the thickness or gauge thereof, the percentage of open area thereof can be between 50 percent and 75 percent.

The part S is a structurally substantial and sound part, suitable for mounting and supporting the electrode structure in a related cell and is such that it can effectively accommodate and carry various forms of sealing means about is perimeter to effect sealing of the electrode in a related cell. Further, the part S is an electric conductor part into and through which current generated at the electrode is conducted and is such that a terminal for the electrode can be effectively fixed thereto.

In FIG. 10 of the drawings, I have shown a terminal 15 fixed to the upper edge of the electrode part S, at the center thereof. The terminal T includes a lower plate-like portion fixec to the part S as by means of rivet fasteners and has an upwardly projecting post to project from a related cell and to connect with conductors of a related electric circuit.

The membrane M is a thin, flat, flexible sheet of gas separating, hydrophobic material which is highly permeable with respect to certain gases and less permeable by other gases. In practice, the membrane M can be as little as ½ mil. thick and might be several mils, thick, depending upon the material of which it is established.

In the form of the invention under consideration wherein the gas is oxygen, it is preferred that the membrane be established of a suitable silicone compound such as dimethyl silicone, since silicone compounds as a general rule allow the passage of or are readily permeated by oxygen and are not readily permeated by nitrogen.

In practice, the membrane M might be advantageously established of certain selected plastic films, such as films established of those plastics which are sold under the tradenames "teflon" and "nylon". Various other kinds of materials, such as parchment paper, can be employed and might be preferred in some instances where their use will enhance fuel cell operation. The membrane M has a flat, smooth rear surface which is in flat supported engagement on and with the front surface of the part S.

The current collector C is a unitary part established of thin sheet metal having a high index of electrical conductivity and which is neutral with or is not subject to being corroded or otherwise adversely affected and/or worked upon by the electrolyte of the cell in which the electrode is used. Alternatively, the current collector C might be advantageously made of a metal which is subject to being adversely worked upon by the electrolyte but which is protected therefrom by a thin plating of a metal which is neutral with respect to the electrolyte. For example, if the electrolyte is a nitric acid solution and the collector C is established of copper and is therefore subject to being attached by th electrolyte, the collector can be plated with tin or nickel to effectively protect it against the electrolyte.

The current collector C is perforated and therefore liquid permeable structure. The perforations in the collector are established by piercing and drawing the sheet metal of which the collector is established forwardly from its rear side to establish forwardly projecting tubular semi-conical protruberances 30 with open front ends 31. That is, the conical protruberances 30 established by the material of the sheet stock is formed forwardly as by sharp cylindrical piercing tools, whereby the inner rear surface of the protruberances are substantially radially inwardly and forwardly radiused; the inside central surfaces thereof are substantially cylindrical and the forward inside surfaces thereof (formed when piercing is initiated) are tapered radially outwardly and forwardly, substantially as indicated or shown in the drawings. Said open ends are in fact irregular and characterized by splitting, tearing and/or burring of the metal. The irregular burred character of the forward open ends of the protuberances is not shown since such details in the drawings would not be graphically effective and would only tend to obscure the true nature of the construction.

Adjacent protruberances 30 are spaced one from the other a distance so that the outermost perimeters of the rear, radiused, inside surfaces are substantially tangential with each other, as clearly illustrated in FIGS. 2, 3 and 6 of the drawings. With such a relationship of the protruberances, a maximum number of protruberances can be provided and the percentage of open area at the front and rear planes or surfaces of the collector C can be maximized.

It has been noted that the basic form and nature of the collector C can be likened to that old fashioned and common form of perforated sheet metal cheese grater structure which is familiar to most people.

In practice, the thickness of the metal stock establishing the collector C and the number and size of protruberances per square inch formed therein can vary widely. The number and size of protruberances is calculated and selected so that the flow and/or migration of electrolyte through the collector C is adequate to wet and saturate the catalytic barrier structure B which is related to the collector C, as will hereinafter be described.

In one satisfactory embodiment of my invention, the collector C is established of 40 gauge sheet metal and is formed with forty protruberances per square inch. It is understood that similar formed sheet material has been satisfactorily and economically produced in quantity with as many as sixteen hundred protruberances per square inch. It is anticipated that in carrying out my invention, depending upon the physical characteristics of the catalytic barrier structure B, and the electrolyte with which the electrode structure is used, the number and size of protruberances formed in the collector C and the percentage of open area thereof will likely have to be varied or adjusted to establish a most effective and efficient operating balance between the collector and catalytic barrier.

The catalytic barrier structure B is where the reactents, such as oxygen and the electrolyte, meet and where the necessary surface sites to induce and support the necessary reaction between the oxygen and electrolyte to maintain fuel cell operation are presented.

In the preferred form of my invention, the catalytic barrier structure B is established of a mixture of high surface area carbon particles, oxide spinals, metallic conductor filaments and a suitable binder. The high surface area carbon particles can be small, finely reduced particles of activated charcoal, channel carbon, acetylene carbon or any of the many other high surface area carbon materials which are known to the suitable electrocatalysts for fuel cells. The oxides spinals can be one or a combination of spinals of cobalt, copper, nickel, aluminum, tungsten, chromium, turmalene, magnesium, selenium and certain other spinals suitable for use in the environment in which my electrode structure might be used.

While I prefer to use spinals of the general character referred to above in combination with the high surface carbon material, it is to be understood that the use of certain metals in finely reduced form, instead of spinals, or in combination with certain spinals, might be preferred and can be used without departing from the broader spirit and aspect of my invention.

The metal conductor filaments of the structure B consist of a multiplicity of fine, elongate filaments of malleable metal having a high index of conductively and which is chemically inert in the environment in which it will be used. The filaments might be made of copper, aluminum, silver or any other suitable and desired metal. If the electrolyte is acid, the filaments must be made of a metal which is chemically inert in that acid electrolyte; if the electrolyte is alkaline, the filaments must be made of a metal which is chemically inert in the alkaline electrolyte. The conductor filaments are dispersed randomly in and throughout the particulate material of the structure B to establish a mechanical binder therefor and are sufficient in number, length and density so that adjacent filaments are in electric contact with each other and establish an open current conducting network within and throughout the structure B and at and throughout the outer surfaces thereof.

The binder can be any one of several bonding and waterproofing adjacents commonly used or known to be suitable to bind together and to waterproof particulate materials such as here employed but which will leave the resulting bonded together and waterproofed structure highly porous for the free movement of liquids therein. Such bonding agents include polyvinylfloride, polysulfone, polyethylene, polytetrafluoroelthylene and fluorinated silicone bonding agents.

The above noted ingredients of the catalytic barrier structure B are combined and mixed together to establish a plastic paste or clay-like mass which can be suitably molded and/or spread to a desired form and thickness and which, when cured, that is, when the bonding agent is cured, establish a unitary porous structure which tends to remain intact or in one piece when subsequently immersed in a liquid, such as an electrolyte. The resulting unitary bonded together structure of particulate material and metal filaments is quite friable and/or frangible and is likely to be such that when immersed in or wetted by an electrolyte, it may tend to erode or slough away. The frangible and/or friable and unstable nature of such bonded together aggregate materials is due to the fact that they must be left to remain as open and porous as possible in order to gain the greatest possible active sites. Accordingly, the amount of bonding agent used must be maintained at a minimum in order that the resulting structure is not plugged and/or made impervious thereby. As a rule, the maintenance of desired porosity and the presenting of the greatest possible number of active sites in such a structure must take preference over structural integrity or strength and a minimal amount of binding agent is therefore used. As a result of the foregoing, such structures are either structurally unsound due to the frugal use of binders or are, if made structurally sound by the use of sufficient binder to impart structural strength thereto, inefficient.

In addition to the above, the binding agents suitable for use in establishing such structures are dielectric in nature and are such that they tend to adversely affect the flow of current in and through the structures. Accordingly, they are used very sparingly.

The establishment of electrocatalytic structures or means for fuel cells composed of particulate carbon materials, spinals or the like and bonding agents is old and well-known in the art, but the addition and/or inclusion therein of conductor filaments such as I provide is new. The filaments that I provide serve two novel and highly important functions. First, they serve as a mechanical binding and reinforcing means which materially enhances the structural integrity of the combined and bonded together materials; and second, they enhance and improve the electrical conductivity of the structure of which they are a part.

With regard to the above, it is well-known and it is to be particularly noted that while electrocatalytic structures for fuel cells composed of particulate carbon, spinals and the like are highly effective for establishing and sustaining fuel cell reaction, they are notably poor electric conductors. Their poor conductivity is such that it generally materially reduces the potential operating effectiveness of the fuel cells.

In my invention, the metal conductor filaments in and throughout the catalytic barrier structure impart into that structure electrical conductivity not afforded by catalytic structures of similar nature provided by the prior art. With my new structure B, increased fuel cell efficiencies are substantially assured.

The catalytic barrier structure B is formed on and throughout the back surface of the current collector C and into and substantially through the protruberances 30 thereof, in conforming intimate contact with all opposing related surfaces of the collector C. The structure B is formed to establish opposing and intimate contact with the front surface of the membrane M.

The above relationship of the barrier structure B with the collector C and membrane M is accomplished by combining all of the ingredients of the structure B to establish a paste or plastic mass, spreading that paste or mass over the back surface of the collector C and forcing it into and through the protruberances in the collector C and by covering the back surface of that mass with the membrane M and suitably pressing and forming the membrane into engagement therewith, so that it is flat and smooth.

It is important to note that with the above relationship of parts, the metal filaments in the structure B, at the front surface thereof, establish electrical contact with the opposing surfaces of the current collector C to conduct current generated within the barrier structure B directly to the collector C.

It is also important to note that the fragile catalytic barrier structure B is contained and held captive between the membrane M and the collector C, with only that material within the open front ends of the protruberances 30 on the collector exposed to the electrolyte in the cell when the electrode structure E is in use. Accordingly, the fragile structure B is most effectively supported and carried within the electrode structure and only a small portion thereof is exposed to and contacted directly by the electrolyte, at and within the open front ends of the protruberances. Those small surface areas of the structure B in said open ends of said protruberances and exposed to the electrolyte are established by material of the structure B which is within and closely contained by the protruberances and is not highly subject to decomposing or sloughing away.

It is to be noted that the current collector C is established of very thin sheet metal stock having little effective cross-sectional area for conducting of current and is likely to be made of a metal having a low index of electric conductivity. Accordingly, the collector C, in many instances, will have high internal resistance and will not conduct the current collected thereby to a single terminal post for the electrode structure E in a most efficient manner.

It will be further noted that the subcombination of parts including the collector C, catalytic barrier structure B and membrane M, is a rather thin, flexible and flimsy assemble which is readily subject to being flexed and bent. Further, the several parts are not securely related or fixed to each other and are subject to delaminating or parting, particularly if the sub-assembly should be bent or flexed.

In accordance with the above, I provide the above noted rigid and structurally stable perforated support and conductor part S at and throughout the back surface of the membrane M and secure that part with the current collector C by a plurality of spaced apart conductor fasteners D with the structure B and membrane M in tight, clamped and contained engagement therebetween.

The fasteners D can be screw fasteners or any other suitabe form of fastener means established of a metal having good electric conducting characteristics. In the form of the invention illustrated, the fastener means F are rivets and, in addition to engaging and extending between the collector C and part S to hold the assembly together, electrically connect the collector C and part S together. The number and spacing of the fasteners D can vary widely in practice and is determined by two factors. First, the number and placement of the fasteners must be such that the assembly of parts is uniformly and securely held and maintained in assembled relationship; and second, the number and placement of fasteners F must be such that current collected by the collector C, at various areas throughout its plane, is conducted by the fasteners D directly to the part S before any appreciable loss in efficiency of the fuel cell is caused by internal resistance of the collector C.

The part S, as noted above, is provided with a terminal post 15 and is structurally such that it imparts into the completed electrode structure that stability and strength which is required and sought to be attained.

With the structure illustrated and described above, it will be apparent that with the membrane M and catalytic barrier structure B clamped between the part S and collector C, maintenance of the membrane M in required uniform contact with the structure B and the structure B in uniform contact with the collector C is assured and possible delamination of the parts of the construction is effectively eliminated.

In FIGS. 8 and 9 of the drawings, I have shown another form of my invention wherein the current collector C' is in the form of a sheet of woven metal fabric imbedded within the catalytic barrier structure B'. The sub-assembly of the collector C' and structure B' is similar to catalytic barrier and current collector structures provided by the prior art. In may invention, however, the sub-assembly of the structure B' and C' are related to a membrane M', and carrier conductor part S' in the same manner that the structure B and collector C are related to the membrane M and part S in the first form of my invention. As in the first form of my invention, the several primary elements and parts of the construction are fastened together by conductor fasteners D' in much the same manner and to the same end as in the first form of the invention.

While the material of the catalytic barrier structure B' in the second form of the invention is not contained as it is in the first form of my invention, most of the advantages provided by the first form of the invention are provided.

One special characteristic of the form of current collector C in the first form of my invention resides in the fact that the rough, uneven, burred, forward open ends of the drawn and formed protruberances 30 function to induce the migration of electrolyte solution into the material of the catalytic barrier structure B, within the protruberances and insure complete wetting and saturation of the structure B. While the precise reason for the above characteristic or function is not fully understood, it is believed to be the result of the greatly increased wetted area presented by the irregularities and/or burrs and the ability of those surfaces to conduct and deliver more liquid to the material of the barrier B, by capillary attraction at the interface between the collector C and barrier structure B.

While I have shown and described my new electrode structure E as a cathodic electrode, it will be apparent that it can be used with equal effectiveness as an anode electrode. Its use as either an anode or cathode electrode depends upon and can be determined by the composition of materials making up the catalytic barrier structure and the materials of which the membrane and current collector are established.

In accordance with the foregoing, it will be apparent that by appropriate selection and use of materials, the electrocatalytic gas electrode structure that I provide can be made to operate in either acid or alkaline anolytes, ionolytes and catholytes, as desired or as circumstances require.

Having described only typical preferred forms and applications of my invention, I do not wish to be limited to the specific details herein set forth, but wish to reserve to myself any modifications and/or variations that might appear to those skilled in the art and which fall within the scope of the following claims:

Having described my invention, I claim:

1. A fuel cell gas electrode positioned between and separating gas and liquid medium in a fuel cell, said electrode includes a flat structural support and electric conductor part of perforated sheet metal having front and rear surfaces and positioned in said cell with its rear surface disposed toward said gas medium, a thin, flat hydrophobic gas separating membrane permeable by a selected gas and having front and rear surfaces positioned with its rear surface in supported contact with the front surface of said part, a flat metallic liquid and gas permeable current collector with front and rear surfaces positioned with its rear surface in spaced opposing relationship with the front surface of said membrane and with its front surface disposed toward the liquid medium, a catalytic barrier structure of bonded together particulate catalytic material carried by the current collector in electric conducting contact therewith and having a rear surface in uniform contact with the front surface of the membrane and a plurality of electric conducting mechanical fasteners in spaced relationship throughout and engaged with and between said part and current collector securing the parts of the electrode in assembled relationship and electrically connecting the current collector with said part.

2. The fuel cell gas electrode set forth in claim 1 wherein the catalytic barrier structure includes a multiplicity of electric conducting elongate metal filaments randomly deposited throughout the particulate catalyst material with adjacent filaments in contact with each other and with filaments in contact with the current collector.

3. The fuel cell gas electrode set forth in claim 2 wherein the catalytic barrier structure extends between the front surface of the membrane and the rear surface of the current collector.

4. The fuel cell gas electrode set forth in claim 3 wherein the current collector is established of woven metal sheet material.

5. The fuel cell gas electrode set forth in claim 3 wherein the current collector is established of perforated sheet metal.

6. The fuel cell gas electrode set forth in claim 3 wherein the current collector is established of sheet metal formed with a multiplicity of forwardly projecting truncated tubular protruberances with open front ends and which are filled with said catalytic material of the barrier structure.

7. The fuel cell gas electrode set forth in claim 2 wherein the current collector is established of woven metal sheet material.

8. The fuel cell gas electrode set forth in claim 2 wherein the current collector is established of perforated sheet metal.

9. The fuel cell gas electrode set forth in claim 2 wherein the current collector is established of sheet metal formed with a multiplicity of forwardly projecting truncated tubular protruberances with open front ends and which are filled with said catalytic material of the barrier structure.

10. The fuel cell gas electrode set forth in claim 1 wherein the catalytic barrier structure extends between the front surface of the membrane and the rear surface of the current collector.

11. The fuel cell gas electrode set forth in claim 10 wherein the current collector is established of woven metal sheet material.

12. The fuel cell gas electrode set forth in claim 10 wherein the current collector is established of perforated sheet metal.

13. The fuel cell gas electrode set forth in claim 10 wherein the current collector is established of sheet metal formed with a multiplicity of forwardly projecting truncated tubular protruberances with open front ends and which are filled with said catalytic material of the barrier structure.

14. The fuel cell gas electrode set forth in claim 1 wherein the current collector is established of woven metal sheet material.

15. The fuel cell gas electrode set forth in claim 1 wherein the current collector is established of perforated sheet metal.

16. The fuel cell gas electrode set forth in claim 1 wherein the current collector is established of sheet metal formed with a multiplicity of forwardly projecting truncated tubular protruberances with open front ends and which are filled with said catalytic material of the barrier structure.

* * * * *